United States Patent
He et al.

(10) Patent No.: US 12,220,735 B2
(45) Date of Patent: Feb. 11, 2025

(54) CLEANING METHOD AND CLEANING TOOL FOR NEGATIVE-PRESSURE COMPONENT FOR BATTERY FORMATION

(71) Applicant: ZHUHAI TITANS NEW POWER ELECTRONICS CO., LTD, Guangdong (CN)

(72) Inventors: Xijun He, Guangdong (CN); Lixuan Wang, Guangdong (CN); Zhenjiang Li, Guangdong (CN); Jie Lu, Guangdong (CN); Li Zhou, Guangdong (CN)

(73) Assignee: ZHUHAI TITANS NEW POWER ELECTRONICS CO., LTD, Zhuhai (CN)

( * ) Notice: Subject to any disclaimer, the term of this patent is extended or adjusted under 35 U.S.C. 154(b) by 0 days.

(21) Appl. No.: 18/186,152

(22) Filed: Mar. 18, 2023

(65) Prior Publication Data

US 2024/0024933 A1     Jan. 25, 2024

Related U.S. Application Data

(63) Continuation of application No. PCT/CN2022/132373, filed on Nov. 16, 2022.

(30) Foreign Application Priority Data

Jul. 19, 2022   (CN) .......................... 202210845716.6

(51) Int. Cl.
*B08B 9/032*    (2006.01)
*H01M 10/04*   (2006.01)

(52) U.S. Cl.
CPC ...... *B08B 9/0328* (2013.01); *B08B 2209/032* (2013.01); *H01M 10/0404* (2013.01)

(58) Field of Classification Search
CPC ... B08B 9/0328; B08B 2209/032; B08B 5/02; B08B 5/04; B08B 9/02; B08B 15/002;
(Continued)

(56) References Cited

U.S. PATENT DOCUMENTS 6,286,179 B1 * 9/2001 Byrne ................ A61B 1/00128
134/169 C
6,305,393 B1 10/2001 Lin
(Continued)

FOREIGN PATENT DOCUMENTS

CN     203599167 U    5/2014
CN     105521960 A    4/2016
(Continued)

OTHER PUBLICATIONS

Hu et al., "A closely-assembled battery acid circulation formation system and using the formation method of the system", Jan. 21, 2020, CN-110718711-A—Machine Translation (Year: 2020).*
(Continued)

*Primary Examiner* — David G Cormier
*Assistant Examiner* — Thomas Bucci
(74) *Attorney, Agent, or Firm* — Nathan & Associates; Menachem Nathan

(57) ABSTRACT

A cleaning method and a cleaning tool for a negative-pressure component for battery formation are provided. The cleaning tool includes a liquid storage tank for storing a cleaning liquid, a power member connected with the liquid storage tank, a storage cup, and a liquid guide member. The storage cup is communicated with the negative-pressure component through the guide member. The cleaning tool has a first pipeline defining a flow from the liquid storage tank to the storage cup. The power member provides power for the flow of the cleaning liquid in the first pipeline to inject the cleaning liquid in the liquid storage tank into the storage (Continued)

cup. The cleaning liquid is sucked into the negative-pressure component from the storage cup by an existing negative-pressure power source of the negative-pressure component. Air sucked by the negative-pressure power source is mixed with the cleaning liquid in the negative-pressure component.

19 Claims, 3 Drawing Sheets

(58) Field of Classification Search
CPC ............ B08B 15/007; B08B 2205/005; B08B 2209/02; H01M 10/0404
USPC ......... 134/102.2, 21, 37, 109, 166 C, 169 C, 134/169 A, 22.11
See application file for complete search history.

(56) References Cited

U.S. PATENT DOCUMENTS

| 2001/0015216 | A1 | | 8/2001 | Reicks | |
|---|---|---|---|---|---|
| 2013/0029186 | A1 | * | 1/2013 | Takada ................ | H01M 50/673 429/82 |
| 2020/0105560 | A1 | * | 4/2020 | Chen ........................ | B08B 1/12 |
| 2020/0411898 | A1 | * | 12/2020 | Yu ........................ | H01M 10/058 |

FOREIGN PATENT DOCUMENTS

| CN | 107234097 | A | | 10/2017 | |
|---|---|---|---|---|---|
| CN | 207521388 | U | | 6/2018 | |
| CN | 208142272 | U | * | 11/2018 | ........ H01M 10/0525 |
| CN | 110718711 | A | * | 1/2020 | ............ H01M 10/04 |
| CN | 212216489 | U | * | 12/2020 | |
| CN | 212264084 | U | | 1/2021 | |
| CN | 113414174 | A | * | 9/2021 | |
| CN | 215644602 | U | | 1/2022 | |
| CN | 215795477 | U | * | 2/2022 | |
| CN | 215965296 | U | * | 3/2022 | |
| CN | 216323812 | U | * | 4/2022 | |
| CN | 114669562 | A | * | 6/2022 | ............. B08B 9/035 |
| CN | 114669563 | A | * | 6/2022 | ............. B08B 9/035 |
| CN | 115301620 | A | | 11/2022 | |
| CN | 108417771 | B | * | 9/2023 | ........ H01M 10/0525 |
| CN | 220005269 | U | * | 11/2023 | |
| DE | 2558239 | A1 | | 6/1977 | |
| JP | 2017013038 | A | | 1/2017 | |

OTHER PUBLICATIONS

International Search Report in International application No. PCT/CN2022/132373, mailed on Dec. 14, 2022.
Chinese Office Action issued in corresponding Chinese Patent Application No. 202210845716.6 dated Mar. 15, 2023, pp. 1-9.
Notice of Allowance issued in corresponding Chinese Patent Application No. 202210845716.6 dated May 18, 2023.
European Extended Search Report in European application No. 22868431.2, mailed on Oct. 2, 2024.

* cited by examiner

CLEANING METHOD AND CLEANING TOOL FOR NEGATIVE-PRESSURE COMPONENT FOR BATTERY FORMATION

CROSS-REFERENCE TO RELATED APPLICATIONS

This application is a continuation of International Application No. PCT/CN2022/132373, filed Nov. 16, 2022, titled "CLEANING METHOD AND CLEANING TOOL FOR NEGATIVE-PRESSURE COMPONENT FOR BATTERY FORMATION", which claims priority to Chinese Patent Application No. 202210845716.6, filed Jul. 19, 2022, titled "CLEANING METHOD AND CLEANING TOOL FOR NEGATIVE-PRESSURE COMPONENT FOR BATTERY FORMATION". The disclosures of the aforementioned applications are hereby incorporated by reference in their entireties.

TECHNICAL FIELD

The present application relates to the field of battery manufacturing technology, and more particularly, to a cleaning method and a cleaning tool for a negative-pressure component for battery formation.

BACKGROUND

Gas generated during formation of a lithium battery is not only harmful to human body, but also causes expansion of the lithium battery to affect safety of the lithium battery. A negative-pressure component having a negative-pressure cup and a suction nozzle is provided to suck and collect the gas during the formation of the lithium battery. However, the gas collected by the negative-pressure may be mixed with electrolytes. The electrolyte remained in the negative-pressure component may be easily form crystals, thereby blocking the negative-pressure component.

It is necessary to clean the negative-pressure component after the formation to solve this problem. It is currently common that the negative-pressure component may be removed by the workers for manual cleaning. However, the manual cleaning has disadvantages in a large workload, difficult operation, low efficiency, and unsafety.

SUMMARY

To solve at least one of the above technical solutions, the present application provides a cleaning tool for a negative-pressure component for battery formation, and a cleaning method for the negative-pressure component using the cleaning tool. The details are followed.

The cleaning tool for a negative-pressure component for battery formation herein includes a liquid storage tank for storing a cleaning liquid, a power member, a storage cup, and a liquid guide member. The power member is connected with the liquid storage tank. The storage cup is connected with the power member. The liquid guide member is provided with a liquid guide channel, and an inner cavity of the storage cup is communicated with the negative-pressure component through the liquid guide channel. The cleaning tool has a first pipeline, the first pipeline defines a flow from the liquid storage tank to the storage cup, and the power member provides power to the cleaning liquid flowing in the first pipeline.

In some embodiments of the present application, the cleaning tool has a second pipeline, the second pipeline defines a flow from the storage cup to the liquid storage tank, the power member provides power to the cleaning liquid flowing in the second pipeline; wherein the cleaning liquid is injected into the storage cup from the liquid storage tank through the first pipeline, and the cleaning liquid is discharged to the liquid storage tank from the storage cup through the second pipeline.

In some embodiments of the present application, the first pipeline is provided with a first check valve and the second pipeline is provided with a third check valve.

In some embodiments of the present application, the cleaning tool includes a first collecting pipe and a plurality of the storage cups, and the first collecting pipe is communicated with the first pipeline.

In some embodiments of the present application, the storage cup is provided with an overflow opening, and the overflow opening is communicated the liquid storage tank.

In some embodiments of the present application, the cleaning tool is provided with a second check valve, and the air enters the cleaning tool through the second check valve.

In some embodiments of the present application, the cleaning tool is provided with a fourth check valve, and the air in the cleaning tool is discharged through the fourth check valve.

In some embodiments of the present application, the cleaning tool includes a filter member, the filter member is disposed in the second pipeline or disposed in the liquid storage tank.

The cleaning method for a negative-pressure component for battery formation herein is realized by a cleaning tool as described in the previous embodiments, and the cleaning method including: injecting a cleaning liquid into a storage cup; communicating the negative-pressure component with a first end of a liquid guide member, wherein the liquid guide member is connected with the storage cup; activating a negative-pressure power source connected with the negative-pressure component, wherein the cleaning liquid in the storage cup enters the negative-pressure component through the liquid guide member; and sucking air to the cleaning liquid in the negative-pressure component by negative-pressure through a second end of the liquid guide member and cleaning the negative-pressure component, when a level of the cleaning liquid in the storage cup is decreased to or below the second end of the liquid guide member.

In some embodiments of the present application, the storage cup is communicated with air source to suck the air from the air source to the storage cup by the negative-pressure.

In some embodiments of the present application, the side wall of the storage cup is provided with an overflow opening.

In some embodiments of the present application, the overflow opening is communicated with the air source.

In some embodiments of the present application, the second end of the liquid guide member is communicated with an inner cavity of the storage cup, and a distance between the second end of the liquid guide member and the negative-pressure component is greater than a distance between the overflow opening and the negative-pressure component in a case that the negative-pressure member is communicated with the liquid guide member.

In some embodiments of the present application, a volume of the storage cup is not greater than a volume of the negative-pressure cup in the negative-pressure component.

In some embodiments of the present application, the first end of the liquid guide member is configured to engage with the negative-pressure component, a recessed chamber is provided on the first end of the liquid guide member, and the recessed chamber is configured to engage with a suction nozzle of the negative-pressure component.

The embodiments of the present application have at least the following advantages. The power member injects the cleaning liquid in the liquid storage tank into the storage cup, the liquid guide member of the cleaning tool is engaged and communicated with the negative-pressure component of a formation equipment, the cleaning liquid is sucked into the negative-pressure component from the storage cup by an original negative-pressure power source of the negative-pressure component, and air sucked by the negative-pressure power source can be mixed with the cleaning liquid in the negative-pressure component. Thus, the cleaning liquid is tumbled and bubbled, thereby promoting the cleaning of the negative-pressure component. The cleaning tool can replace manual cleaning, reduce working strength, and improve cleaning efficiency. The cleaning tool and the cleaning method can be widely applied to the technical field of battery manufacturing.

BRIEF DESCRIPTION OF THE DRAWINGS

The above and/or additional aspects and advantages of the present application will become apparent and readily understood from the following description of embodiments taken in conjunction with the accompanying drawings.

Figure 1:
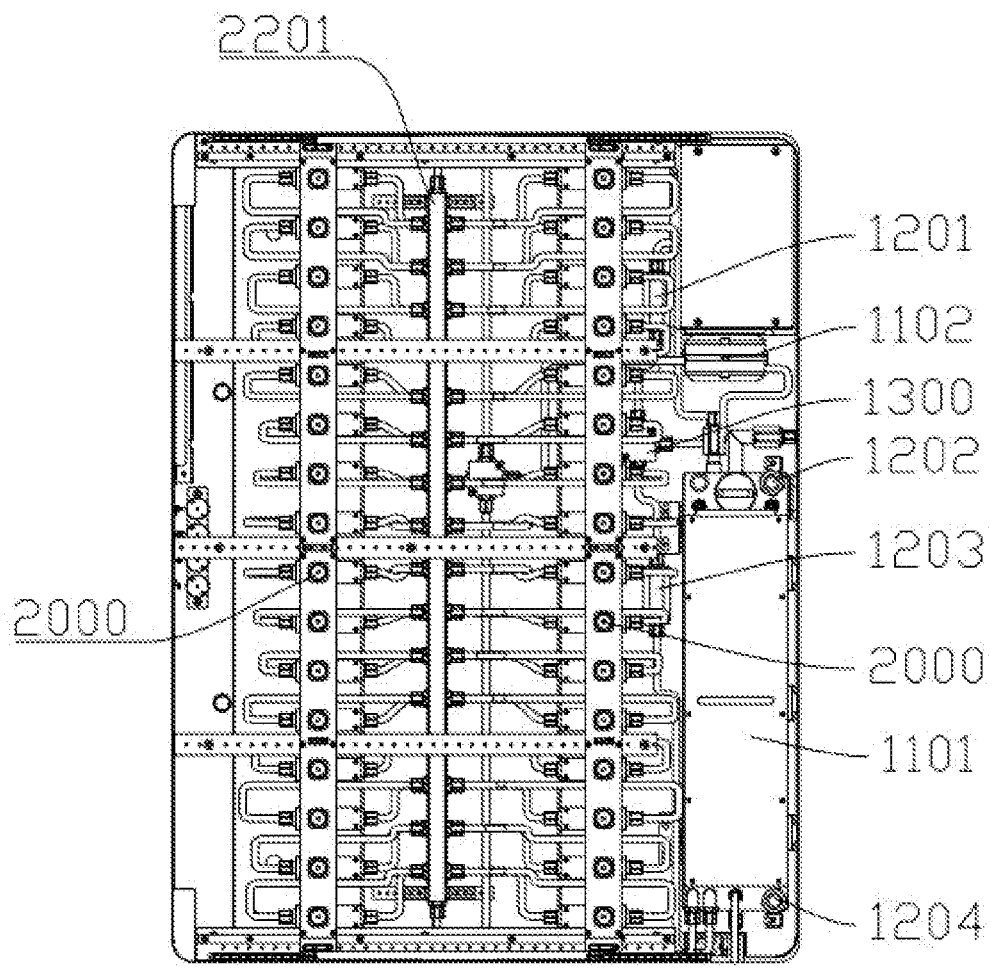
FIG. 1 is a schematic structural diagram of a cleaning tool.

REFERENCE NUMERAL 1000. negative-pressure cup; 1001. suction nozzle; 1002. negative-pressure power source;
1101. liquid storage tank; 1102. power member;
1201. first check valve; 1202. second check valve; 1203. third check valve; 1204. fourth check valve;
1300. first tee joint;
2000. storage cup;
2100. liquid guide member; 2101. straw; 2102. end structure; 2103. recessed chamber;
2201. first collecting pipe; 2202. overflow pipe; 2203. second collecting pipe;
3000. filter member.

DETAILED DESCRIPTION OF THE EMBODIMENTS

Figure 2:
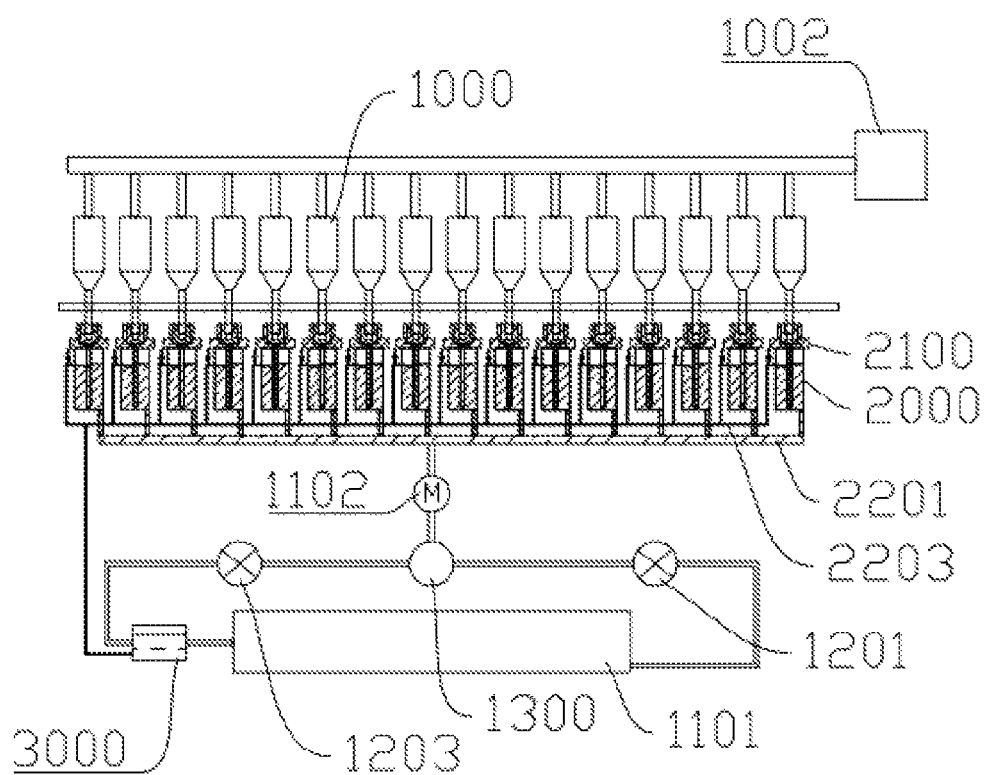
FIG. 2 is schematic diagram of a cleaning tool.
Figure 3:
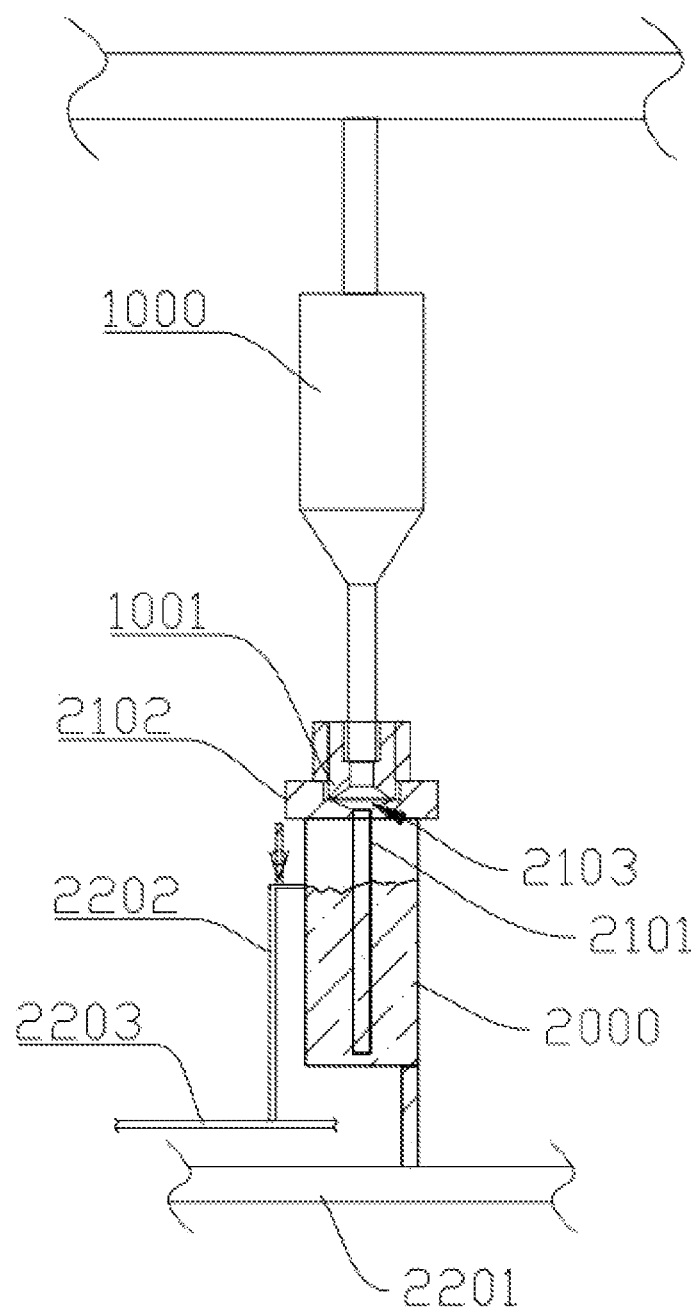
FIG. 3 is a schematic structural diagram of an engagement of a negative-pressure component and a storage cup.

Embodiments of the present application are described in detail below with FIGS. 1 to 3, and examples of the embodiments are illustrated in the accompanying drawings. The identical or similar reference numerals refer to identical or similar elements or elements having identical or similar functions throughout. The embodiments described below by reference to the accompanying drawings are exemplary and are merely illustrative of the present application and are not to be construed as limiting the application.

In the description of this application, it should be understood that the azimuth or positional relationship indicated by the terms "center", "central portion", "longitudinal", "transverse", "length", "width", "thickness", "upper", "lower", "front", "rear", "left", "right", "vertical", "horizontal", "top", "bottom", "inner", "outer", "axial", "radial", "circumferential", and the like, is based on the azimuth or positional relationship shown in the drawings, merely for ease of description of this application and simplification of the description, and is not intended to indicate or imply that the device or element referred to must have a particular azimuth, be constructed and operated in a particular azimuth, and therefore is not to be construed as limiting the application. Further, features defining by "first" and "second" may explicitly or implicitly include one or more these features. In the description of this application, unless otherwise stated, "plurality" means two or more.

In the description of the present application, it should be understood that, unless expressly stated and defined otherwise, the terms "mount", "conduct", "connect" are to be understood in a broad sense, for example, as a fixed connection, as a detachable connection, or as an integrated connection. It may be a mechanical connection or an electrical connection. It may be directly connected or indirectly connected by means of an intermediate medium, and it may be internal communication of the two elements. The specific meaning of the above terms in the present application can be understood in a specific way to those of ordinary skill in the art.

The present application relates to a cleaning tool for a negative-pressure component for battery formation. The cleaning tool includes a liquid storage tank 1101 and a storage cup 2000. The liquid storage tank 1101 is disposed in a cabinet of the cleaning tool and configured to store a cleaning liquid, and the cleaning liquid stored in the liquid storage tank 1101 is transferred to the storage cup 2000. The storage cup 2000 is configured to engage with a negative-pressure cup 1000. Specifically, the negative-pressure component includes a negative-pressure cup 1000 and a suction nozzle 1001, and the negative-pressure component is communicated with the storage cup 2000. A negative-pressure is supplied to the negative-pressure component by a negative-pressure power source 1002 of the plant, so that the cleaning liquid in the storage cup 2000 is sucked into the negative-pressure cup 1000 to clean the negative-pressure component.

It should be understood that it is not necessary to disassemble the negative-pressure component, but rather to move the negative-pressure component from the formation equipment to the cleaning tool. The negative-pressure component engages with the storage cup 2000, and the exiting negative-pressure power source 1002 of the negative-pressure component provides the negative-pressure for sucking cleaning liquid. In an aspect, since the negative-pressure component does not need to be disassembled, the manual cleaning is replaced to reduce the working strength and to improve the efficiency. Meanwhile, the negative-pressure component is prevented from destroying, the assembly accuracy of the negative-pressure component is ensured, and the airtightness of the negative-pressure component is prevented from being affected. On the other hand, the existing equipment of the plant is reasonably utilized, so that the cleaning cost is saved.

In order to prevent the cleaning liquid from entering the air path of the negative-pressure power source 1002 during suction of the cleaning liquid by the negative-pressure cup 1000, the storage cup 2000 is further designed to have a volume not greater than a volume of the negative-pressure cup 1000. Alternatively, the flow rate of the cleaning liquid may be controlled to ensure that the amount of the cleaning liquid in the storage cup 2000 is insufficient to enter the air path of the negative-pressure power source 1002. In some examples, the flow of the cleaning liquid injected into the storage cup 2000 may be controlled by a throttle valve.

Referring to the Figures, the cleaning tool includes a power member 1102 disposed in the cabinet of the cleaning tool, wherein the storage cup 2000 is connected with the power member 1102, the power member 1102 is connected with the liquid storage tank 1101, and the power member 1102 provides power for the flow of cleaning liquid. Further, the power member 1102 is designed to operate in both a forward driving mode and a reverse driving mode. When the power member 1102 is driven in the forward driving mode, the cleaning liquid is driven to flow to the storage cup 2000. When the power member 1102 is driven in the reverse driving mode, the cleaning liquid is driven to flow out of the storage cup 2000. In some examples, the power member 1102 is provided as a peristaltic pump.

The cleaning tool has a first pipeline, which defines a flow of the cleaning liquid from the liquid storage tank 1101 to the storage cup 2000. The power member 1102 provides power for the flow of the cleaning liquid in the first pipeline. Specifically, under the action of the power member 1102, the cleaning liquid in the liquid storage tank 1101 flows to the storage cup 2000 through the first pipeline, so that the liquid storage tank 1101 injects the liquid into the storage cup 2000.

Further, a first check valve 1201 is provided to define that the flow of the cleaning liquid in the first pipeline is from the liquid storage tank 1101 to the storage cup 2000, specifically, the first check valve 1201 is connected to a liquid outlet of the liquid storage tank 1101. It should be understood that the first check valve 1201 also provides an explosion protection. In some examples, the first check valve 1201 is provided as a mechanical valve.

Referring to the Figures, the cleaning tool includes a liquid guide member 2100 having a first end and a second end, and the liquid guide member 2100 is provided with a liquid guide channel. It should be understood that the liquid guide channel extends from the second end of the liquid guide member 2100 to the first end of the liquid guide member 2100. The liquid guide member 2100 is connected with the storage cup 2000, and the inner cavity of the storage cup 2000 is communicated with the negative-pressure component through the liquid guide channel. Specifically, the second end of the liquid guide member 2100 is communicated with the inner cavity of the storage cup 2000, and the first end of the liquid guide member 2100 is used to communicate with the negative-pressure component. Under the action of the negative-pressure power source 1002, the cleaning liquid in the storage cup 2000 enters the suction nozzle 1001 and the negative-pressure cup 1000 of the negative-pressure component through the liquid guide channel of the liquid guide member 2100. The cleaning liquid can also be used to clean the suction nozzle 1001 during flowing to the negative-pressure cup 1000.

It should be understood that in the case where the negative-pressure component is closely connected or closely pressed to the first end of the liquid guide member 2100, the liquid guide member 2100 having the liquid guide channel can be configured to improve the suction of the cleaning liquid by the negative-pressure, so that the suction and cleaning by the negative-pressure can be performed with a low negative-pressure value, thereby reducing the output power of the negative-pressure power source 1002.

In some examples, the second end of the liquid guide member 2100 extends from the mouth of the storage cup 2000 into the inner cavity of the storage cup 2000, and the first end of the liquid guide member 2100 is used to engage with the negative-pressure component. Further, the first end of the liquid guide member 2100 is provided with a sealing ring or a sealing gasket to improve the airtightness and to prevent leakage of the cleaning liquid.

As an alternative to the method of engaging the negative-pressure component, the negative-pressure component may be closely engaged or closely pressed to the mouth of the storage cup 2000. In this case, the sealing ring or the sealing gasket is provided at the mouth of the storage cup 2000.

As an alternative to the position of the second end of the liquid guide member 2100, in some examples, the second end of the liquid guide member 2100 is connected to the side wall of the storage cup 2000, and specifically, the second end of the liquid guide member 2100 communicates to the inner cavity of the storage cup 2000 through the side wall of the storage cup 2000. Further, the second end of the liquid guide member 2100 is provided on the side wall of the storage cup 2000 and is close to the bottom of the storage cup 2000. In some examples, the second end of the fluid guiding member 2100 is provided on the bottom wall of the storage cup 2000.

During the cleaning liquid in the storage cup 2000 flowing into the negative-pressure cup 1000, when the level of the cleaning liquid in the storage cup 2000 decreases to or below the second end of the liquid guide member 2100, the air in the storage cup 2000 is sucked into the cleaning liquid of the negative-pressure component through the liquid guide member 2100 by the negative-pressure. Specifically, in the negative-pressure cup 1000, the air mixed into the cleaning liquid can generate bubbles in the cleaning liquid, so that the cleaning liquid is in a tumbling, bubbling, "boiling" state to promote cleaning.

It should be understood that, if the second end of the liquid guide member 2100 is provided in the storage cup 2000 and there is a gap between the second end of the liquid guide member 2100 and the liquid level of the cleaning liquid in the storage cup 2000, it indicates that the level of the cleaning liquid in the storage cup 2000 has been decreased to or below the second end of the liquid guide member 2100. If the second end of the liquid guide member 2100 is provided to be connected to the side wall of the storage cup 2000 or the bottom wall of the storage cup 2000 and the second end of the liquid guide member 2100 is partially or completely exposed out of the level of the cleaning liquid in the storage cup 2000, it indicates that the cleaning liquid level in the storage cup 2000 has been decreased to or below the second end of the liquid guide member 2100.

As an embodiment, the storage cup 2000 is in communication with an air source, so that the air of the air source is sucked into the storage cup 2000 by the negative-pressure to balance the pressure inside the cleaning tool, and, on the other hand, to supply more air with the negative-pressure component to tumble and bubble the cleaning liquid in the negative-pressure component. In some examples, ambient air is served as the air source. In some examples, a gas cylinder is served as the air source, and the gas cylinder stores water-insoluble inert gases or nitrogen gases, and in this case the pressure of the gas cylinder during cleaning should be greater than the negative-pressure of the negative-pressure power source 1002.

Specifically, the side wall of the storage cup 2000 is provided with an air inlet communicating with the outside. Referring to the Figures, the cleaning tool is provided with a second check valve 1202, the second check valve 1202 is communicated with the air inlet of the storage cup 2000, and the air enters the cleaning tool through the second check valve 1202.

In some examples, the storage cup 2000 is communicated with the outside through the second check valve 1202, and the outside air can enter the storage cup 2000 through the second check valve 1202. Specifically, the second check valve 1202 is provided at the air inlet of the storage cup 2000. In some examples, the storage cup 2000 is communicated with the gas cylinder through the second check valve 1202, on one hand, the second check valve 1202 can define the direction of the air flow, and on the other hand, the second check valve 1202 has an explosion-proof effect.

During cleaning of the negative-pressure component by the cleaning liquid, the pressure difference between interior and exterior of the storage cup 2000 generated by the negative-pressure power source 1002 can trigger the second check valve 1202, the air through the second check valve 1002 continuously enters the storage cup 2000 to replenish the air flow to the negative-pressure cup 1000, so that the cleaning liquid in the negative-pressure cup 1000 is continuously in a tumbling, bubbling, "boiling" state.

It should be understood that, after actuating power member 1102 in the forward driving mode for injecting the liquid, the pressure difference between the interior of the liquid storage tank 1101 and the atmosphere can also trigger the second check valve 1202, the air enters the pipeline in the cleaning tool through the second check valve 1202. The air enters the liquid storage tank 1101 to ensure the balance of the internal and external pressure and ensure the flow of cleaning liquid in the cleaning tool.

Further, the first end of the liquid guide member 2100 is provided with a recessed chamber 2103, the liquid guide channel is communicated with the recessed chamber 2103, and the recessed chamber 2103 is used for engaging the suction nozzle 1001 of the negative-pressure component. Specifically, in the case where the negative-pressure component is engaged with the storage cup 2000, the suction nozzle 1001 is engaged with an inner cavity of the recessed chamber 2103. It should be understood that one end of the suction nozzle 1001 protrudes for engaging with the recess chamber 2103, and the other end of the suction nozzle 1001 is connected to the negative-pressure cup 1000. The structure protruded from the end of the suction nozzle 1001 is non-contacted with the recessed chamber 2103.

The suction nozzle 1001 can be immersed in the cleaning liquid in the recessed chamber 2103 so as to sufficiently clean the suction nozzle 1001, while the cleaning liquid is sucked into the negative-pressure cup 1000 by the negative-pressure. It should be understood that, while the air is sucked into the negative-pressure cup 1000 by the negative-pressure, the air sucked can also be mixed with the cleaning liquid in the recessed chamber 2103. Thus, the cleaning liquid in the recessed chamber 2103 is tumbled, bubbled, "boiled" to promote cleaning of the suction nozzle 1001.

In some examples, the recessed chamber 2103 is provided as a tapered shape, an end of the recessed chamber 2103 with a smaller diameter end communicates with the liquid guide channel, and an end of the recessed chamber 2103 with a larger diameter end communicates with the negative-pressure component. Specifically, the recessed chamber 2103 is provided as a trumpet mouth.

As an embodiment, the liquid guide member 2100 includes an end structure 2102 and a straw 2101, wherein the end structure 2102 is positioned at the mouth of the storage cup 2000 and used to engage with the negative-pressure component. The recessed chamber 2103 is disposed in the end structure 2102, the straw 2101 is connected to the end structure 2102, and the straw 2101 is extended into the storage cup 2000.

Referring to the Figures, the storage cup 2000 is provided with an overflow opening. The overflow opening is provided on the side wall of the storage cup 2000. The overflow opening extends through the side wall of the storage cup 2000 and communicates with the liquid storage tank 1101. Specifically, the cleaning tool includes an overflow pipe 2202 connected with the overflow opening, and the overflow pipe 2202 is connected to the liquid storage tank 1101. In an example, the overflow pipe 2202 is connected to a liquid inlet of the liquid storage tank 1101. It should be understood that during the injection of the liquid into the storage cup 2000 and the cleaning of the negative-pressure component by the cleaning liquid, some of the cleaning liquid overflows from the overflow opening and flows back to the liquid storage tank 1101 through the overflow pipe 2202.

It should be understood that in the case where the overflow pipe 2202 is provided, in some examples, the second check valve 1202 may be designed to be provided to the liquid storage tank 1101 or the second check valve 1202 may be designed to be provided to the overflow pipe 2202. In this case, the overflow opening of the storage cup 2000 is integrated with the air inlet of the storage cup 2000, and the overflow opening communicates with the air source. The air enters the storage cup 2000 through the overflow opening. Specifically, in the case where the second check valve 1202 is provided to the liquid storage tank 1101, the outside air can flow into the storage cup 2000 from the overflow pipe 2202 after entering the liquid storage tank 1101 through the second check valve 1202. In some examples, the second check valve 1202 is provided on top of the liquid storage tank 1101.

Further, in the case where the negative-pressure component is communicated with the liquid guide member 2100, the distance between the second end of the liquid guide member 2100 and the negative-pressure component is greater than the distance between the overflow opening and the negative-pressure component.

After cleaning the negative-pressure component, the vacuum state is relieved, the cleaning liquid in the negative-pressure cup 1000 flows back to the storage cup 2000, and the storage cup 2000 discharges the cleaning liquid. Specifically, the cleaning tool has a second pipeline, which defines a flow of the cleaning liquid from the storage cup 2000 to the liquid storage tank 1101. The power member 1102 provides power for the flow of the cleaning liquid in the second pipeline. Specifically, under the action of the power member 1102, the cleaning liquid in the storage cup 2000 flows to the liquid storage tank 1101 through the second pipeline, so that the storage cup 2000 discharges the liquid to the liquid storage tank 1101.

Further, a third check valve 1203 is provided to define that the flow of the cleaning liquid in the second pipeline is from the storage cup 2000 to the liquid storage tank 1101, specifically, the third check valve 1203 is connected to a liquid inlet of the liquid storage tank 1101. It should be understood that the third check valve 1203 also enables explosion protection. In some examples, the third check valve 1203 is provided as a mechanical valve.

The cleaning tool is provided with a fourth check valve 1204 through which the air in the cleaning tool can be discharged. In some examples, the fourth check valve 1204 is connected to the liquid storage tank 1101. Specifically, the fourth check valve 1204 is provided at the top of the liquid storage tank 1101, and the air in the liquid storage tank 1101 is discharged from the fourth check valve 1204 while the cleaning liquid enters the liquid storage tank 1101 through the second pipeline.

It should be understood that, after actuating the power member 1102 in reverse driving mode for discharging the liquid, the fourth check valve 1204 is triggered by the pressure difference between the atmosphere and the interior of the liquid storage tank 1101, and the air in the pipeline of the cleaning tool is discharged. The air in the liquid storage tank 1101 is discharged through the fourth check valve 1204, so that the balance of the internal and external pressure can be ensured, and the flow of the cleaning liquid can be ensured.

In some examples, the fourth check valve 1204 is provided for communicating with the exhaust gas collection system through the pipelines, to collect the exhaust gases discharged from the cleaning tool and to prevent emissions of explosive and corrosive gases to the atmosphere.

As an alternative to the position of the fourth check valve 1204, the fourth check valve 1204 may be designed to be connected to the side wall of the storage cup 2000. It should be understood that the air in the storage tank 1101 flows through the overflow pipe 2202 to the storage cup 2000 and is discharged from the fourth check valve 1204. In this case, a port on the side wall of the storage cup 2000 for communicating in the second pipeline should be smaller than the overflow opening, so that the cleaning liquid is prevented from filling the overflow pipe 2202 to effect the air in the liquid storage tank 1101 to discharge.

As an embodiment, the cleaning tool includes a first tee joint 1300 having a first end, a second end, and a third end, wherein the first end is connected to the first check valve 1201, the second end is connected to the third check valve 1203, and the third end is connected to the power member 1102. It should be understood that the pipe disposed with the power member 1102, the pipe disposed with the first check valve 1201, and the pipe disposed with the third check valve 1203 meet at the first tee joint 1300. In some examples, the first tee joint 1300 is provided as a three-way valve.

Specifically, when the power member 1102 is driven in the forward driving mode, the first check valve 1201 is open, the third check valve 1203 is closed, and the first pipeline from the liquid storage tank 1101 to the storage cup 2000 is conducted through the first check valve 1201. When the power member 1102 is driven in the reverse driving mode, the first check valve 1201 is closed, the third check valve 1203 is open, and the second pipeline from the storage cup 2000 to the liquid storage tank 1101 is conducted through the third check valve 1203.

As an alternative to inject and discharge the liquid with the cleaning tool, the cleaning tool may be designed without the second pipeline, and the first pipeline may be designed without the first check valve 1201. In this case, the first pipeline does not define the flow direction, and the first pipeline is configured to inject and discharge the cleaning liquid.

Referring to the Figures, a cleaning tool includes a filter member 3000 with at least one filter screen, wherein the filter member 3000 is connected to a liquid inlet of the liquid storage tank 1101, and the filter member 3000 is used to filter the cleaning liquid flowing back to the liquid storage tank 1101, thereby facilitating reuse of the cleaning liquid.

Specifically, the filter member 3000 is provided in the second pipeline. It should be understood that, after cleaning, the cleaning liquid discharged from the storage cup 2000 is filtered by the filter member 3000 and then returned to the liquid storage tank 1101. In some examples, the filter member 3000 is disposed on the pipeline between the second end of the first tee joint 1300 and the liquid storage tank 1101.

As an alternative to the position of the filter member 3000, the filter member 3000 may be provided in the liquid storage tank 1101, and more specifically, the filter member 3000 is disposed at a liquid inlet of the liquid storage tank 1101.

In some examples, the filter member 3000 is designed to filter the backflow cleaning liquid in the overflow pipe 2202, and specifically, the overflow pipe 2202 is provided to be connected to the filter member 3000. In some examples, in the case where a second collecting pipe 2203 is provided, the second collecting pipe 2203 is connected to the filter member 3000 through the pipeline.

As an embodiment, considering that a plurality of negative-pressure components is provided in the apparatus for battery formation, accordingly, a plurality of storage cups 2000 are included in the cleaning tool. Each of the storage cups 2000 is connected to a corresponding negative-pressure component, thereby improving the cleaning efficiency and ensuring cleaning synchronously. Moreover, each of the negative-pressure components can be effectively cleaned.

Referring to the Figures, the cleaning tool includes a first collecting pipe 2201 connected to a plurality of storage cups 2000, and the first collecting pipe 2201 is in communication with the first pipeline. It should be understood that, under the action of the power member 1102, the cleaning liquid in the liquid storage tank 1101 flows into the first collecting pipe 2201 through the first pipeline, and then the cleaning liquid in the first collecting pipe 2201 is injected into each storage cup 2000.

Further, the cleaning tool includes a second tee joint, wherein an end of the second tee joint is connected to the power member 1102, and the remaining two ends of the second tee joint are connected to an end of a first portion of the first collecting pipe 2201 and an end of a second portion of the first collecting pipe 2201, respectively. Specifically, during injecting the cleaning liquid, the cleaning liquid flows to the end of the first portion of and the end of the second portion of the first collecting pipe 2201 through the second tee joint, respectively. Without the second tee joint, the cleaning liquid flows to the first collecting pipe 2201 from only one end, and in this case, the cleaning liquid is advanced less and less along the length direction of the first collecting pipe 2201, which may lead to the "head-to-tail" effect. The second tee joint is provided in the present application, thus, the cleaning liquid flows to the first collecting pipe 2201 from two ends and is advanced uniformly to prevent the "head-to-tail" effect. In some examples, the second tee joint is provided as a three-way valve.

It should be understood that in the case where a plurality of storage cups 2000 are provided, in some examples, the cleaning tool includes a second collecting pipe 2203, wherein the overflow pipe 2202 of each storage cup 2000 is respectively connected to the second collecting pipe 2203, the second collecting pipe 2203 is connected to the liquid storage tank 1101, and the second collecting pipe 2203 is communicated with a liquid inlet of the liquid storage tank 1101.

In some examples, the cleaning tool includes a first level gauge connected to the liquid storage tank 1101, and the first level gauge is used to detect the level of the cleaning liquid in the liquid storage tank 1101 so as to perform liquid injection, liquid replenishment, and liquid discharge, and thereby effectively preventing overflow of the cleaning liquid in the liquid storage tank 1101. Specifically, the first level gauge is provided as a liquid level sensor electrically connected to the control module of the cleaning tool so as to feed back the level of the cleaning liquid in real time.

When the second check valve 1202 is connected to the liquid storage tank 1101, the level of the cleaning liquid in the liquid storage tank 1101 is monitored by the first level gauge, so that the cleaning liquid can be prevented from clogging the second check valve 1202, and the air path in the cleaning tool can be prevented from clogging. It should be understood that, in the case where the fourth check valve 1204 is connected to the liquid storage tank 1101, the first level gauge can monitor the level of the cleaning liquid in the liquid storage tank 1101 in a similar way.

In some examples, the cleaning tool includes a second level gauge connected to the storage cup 2000, and the second level gauge is used to detect the level of the cleaning liquid in the storage cup 2000 during injection and discharge of the cleaning liquid. Specifically, the second level gauge is provided as a liquid level sensor electrically connected to the control module of the cleaning tool so as to feed back the level of the cleaning liquid in real time.

The present application relates to a cleaning method for a negative-pressure component for battery formation. The cleaning method uses the cleaning tool as described above to clean the negative-pressure component. The existing negative-pressure power source 1002 in the plant is connected to the negative-pressure component to suck the cleaning liquid in the storage cup 2000 into the negative-pressure component. The details of the cleaning method are as follows.

The negative-pressure component is communicated with the storage cup 2000. Specifically, the negative-pressure component is communicated with the liquid guide member 2100 connected to the storage cup 2000. The negative-pressure component is engaged with the first end of the liquid guide member 2100, and the negative-pressure cup 1000 is communicated with the liquid guide channel of the liquid guide member 2100.

The cleaning liquid is injected into the storage cup 2000. Specifically, the power member 1102 is driven in the forward driving mode, and the first pipeline of the cleaning tool is conducted, and the cleaning liquid in the liquid storage tank 1101 enters into the storage cup 2000 through the first pipeline. When the level of the cleaning liquid in the storage cup 2000 reaches the preset position, it stops injecting the liquid. In another embodiment, it stops injecting the liquid after reaching a preset time setting for the liquid injection.

After the above preparation, the negative-pressure power source 1002 connected to the negative-pressure component is activated, and the cleaning liquid in the storage cup 2000 enters the negative-pressure component through the liquid guide member 2100, to clean the suction nozzle 1001 and the negative-pressure cup 1000 of the negative-pressure component. During operation of the negative-pressure power source 1002, the negative-pressure value can be controlled by a proportional valve, and the duration of the suction by the negative-pressure is set according to the type of the negative-pressure component, that is, the duration of the cleaning is set.

After the cleaning is completed, the negative-pressure power source 1002 is turned off, the negative-pressure is relieved, and the cleaning liquid in the negative-pressure component flows back to the storage cup 2000 due to the positive pressure and the self-weight.

The power member 1102 is driven in the reverse driving mode, the second pipeline of the cleaning tool is conducted, and the cleaning liquid in the storage cup 2000 flows back to the liquid storage tank 1101 through the second pipeline.

It should be understood that when the level of the cleaning liquid in the storage cup 2000 has been decreased to or below the second end of the liquid guide member 2100 during the cleaning liquid entering the negative-pressure component, the air in the storage cup 2000 is sucked to the negative-pressure component through the liquid guide member 2100 due to the negative-pressure provided by the negative-pressure power source 1002. The air mixes with the cleaning liquid to clean the negative-pressure cup 1000 and the suction nozzle 1001 of the negative-pressure component.

It should be understood that the air sucked into the negative-pressure cup 1000 is mixed with the cleaning liquid, so that the cleaning liquid in the negative-pressure cup 1000 generates a tumbling, bubbling, "boiling" state, thereby facilitating sufficient cleaning of the negative-pressure cup 1000.

Further, the liquid guide member 2100 is provided with a recessed chamber 2103 at the first end, and the suction nozzle 1001 of the negative-pressure component is immersed in the cleaning liquid in the recessed chamber 2103. The air sucked by the negative-pressure provided by the negative-pressure power source 1002 is mixed with the cleaning liquid in the recessed chamber 2103, so that the cleaning liquid is in a tumbling, bubbling, "boiling" state, thereby facilitating sufficient cleaning of the suction nozzle 1001.

In the description of this specification, reference to the terms "one embodiment," "some examples," "some embodiments," "illustrative embodiments," "examples," "specific examples," or "some examples," etc., means that a particular feature, structure, material, or characteristic described in connection with the embodiment or example is included in at least one embodiment or example of the present application. In the present specification, the schematic representation of the above references does not necessarily refer to the same embodiments or examples. Moreover, the specific features, structures, materials, or characteristics described may be combined in any one or more embodiments or examples in a suitable manner.

Although the embodiments of the present application have been described in detail with reference to the accompanying drawings, the present application is not limited to the above embodiments, and various changes may be made without departing from the spirit of the present application and the knowledge of ordinary skill in the art.

In the description of this application, the term "," in the title means the relationship of "and", rather than the relationship of "or". For example, the title with "A, B" indicates that the present application protects the technical solution with the title A and the technical solution with the title B.

What is claimed is:
1. A cleaning method for a negative-pressure component for battery formation, wherein the cleaning method for a negative-pressure component for battery formation uses a cleaning tool for a negative-pressure component for battery formation, the negative-pressure component comprising a negative-pressure cup and a suction nozzle, wherein the cleaning tool comprises:
   a storage cup, wherein the storage cup is configured to engage with the negative-pressure cup, and the storage cup is communicated with an air source; and
   a liquid guide member, wherein the liquid guide member is provided with a liquid guide channel, and an inner cavity of the storage cup is communicated with the negative-pressure component through the liquid guide channel;
   wherein a first end of the liquid guide member is configured to communicate with the negative-pressure component, and a second end of the liquid guide member is extended from a mouth of the storage cup into the storage cup; and a second check valve, wherein the second check valve is communicated with the storage cup;

wherein cleaning method for negative-pressure component for battery formation comprises:

the injecting a cleaning liquid into the storage cup;

communicating the negative-pressure component with the first end of the liquid guide member, wherein the liquid guide member is connected with the storage cup;

activating a negative-pressure power source connected with the negative-pressure component, wherein the cleaning liquid in the storage cup enters the negative-pressure component through the liquid guide member;

triggering the second check valve, wherein air enters the storage cup from the air source through the second check valve to replenish an air flow to the negative-pressure cup; and sucking air to the cleaning liquid in the negative-pressure component by negative-pressure through the second end of the liquid guide member and cleaning the negative-pressure component, when a level of the cleaning liquid in the storage cup is decreased to or below the second end of the liquid guide member.

2. The cleaning method for a negative-pressure component for battery formation of claim 1, wherein the storage cup is communicated with the air source to suck the air from the air source to the storage cup by the negative-pressure.

3. The cleaning method for a negative-pressure component for battery formation of claim 2, wherein an overflow opening is provided on a side wall of the storage cup.

4. The cleaning method for a negative-pressure component for battery formation of claim 3, wherein the overflow opening is communicated with the air source.

5. The cleaning method for a negative-pressure component for battery formation of claim 3, wherein the second end of the liquid guide member is communicated with an inner cavity of the storage cup, and a distance between the second end of the liquid guide member and the negative-pressure component is greater than a distance between the overflow opening and the negative-pressure component in a case that the negative-pressure component is communicated with the liquid guide member.

6. The cleaning method for a negative-pressure component for battery formation of claim 1, wherein a volume of the storage cup is not greater than a volume of the negative-pressure cup of the negative-pressure component.

7. The cleaning method for a negative-pressure component for battery formation of claim 1, wherein the first end of the liquid guide member is configured to engage with the negative-pressure component, a recessed chamber is provided on the first end of the liquid guide member, and the recessed chamber is configured to engage with the suction nozzle of the negative-pressure component.

8. The cleaning method for a negative-pressure component for battery formation of claim 1, wherein the liquid guide member comprises an end structure and a straw, the end structure is positioned at the mouth of the storage cup, the straw is connected to the end structure, and the straw is extended into the storage cup.

9. The cleaning method for a negative-pressure component for battery formation of claim 1, wherein a side wall of the storage cup is provided with an air inlet, and the air inlet is communicated with outside or air source.

10. A cleaning tool for a negative-pressure component for battery formation, the negative-pressure component comprising a negative-pressure cup and a suction nozzle, wherein the cleaning tool comprises:

a storage cup, wherein the storage cup is configured to engage with the negative-pressure cup, and the storage cup is communicated with an air source;

a liquid guide member, wherein the liquid guide member is provided with a liquid guide channel, and an inner cavity of the storage cup is communicated with the negative-pressure component through the liquid guide channel;

wherein a first end of the liquid guide member is configured to communicate with the negative-pressure component, and a second end of the liquid guide member is extended from a mouth of the storage cup into the storage cup; and a second check valve, wherein the second check valve is communicated with the storage cup, and air enters the storage cup from the air source through the second check valve to replenish an air flow to the negative-pressure cup.

11. The cleaning tool for a negative-pressure component for battery formation of claim 10, wherein the cleaning tool further comprises:

a liquid storage tank, wherein the liquid storage tank is configured to store a cleaning liquid; and a power member, wherein the power member is connected with the liquid storage tank; wherein the storage cup is connected with the power member;

wherein the cleaning tool has a first pipeline between the liquid storage tank and the storage cup, and the power member provides power to the cleaning liquid flowing in the first pipeline;

wherein the cleaning tool has a second pipeline, the second pipeline defines a flow from the storage cup to the liquid storage tank, the power member provides power to the cleaning liquid flowing in the second pipeline; wherein the cleaning liquid is injected into the storage cup from the liquid storage tank through the first pipeline, and the cleaning liquid is discharged to the liquid storage tank from the storage cup through the second pipeline.

12. The cleaning tool for a negative-pressure component for battery formation of claim 11, wherein the first pipeline is provided with a first check valve, and the second pipeline is provided with a third check valve.

13. The cleaning tool for a negative-pressure component for battery formation of claim 10, wherein the cleaning tool comprises a first collecting pipe and a plurality of storage cups, and the first collecting pipe is communicated with a first pipeline.

14. The cleaning tool for a negative-pressure component for battery formation of claim 11, wherein the storage cup is provided with an overflow opening, and the overflow opening is communicated the liquid storage tank.

15. The cleaning tool for a negative-pressure component for battery formation of claim 10, wherein the cleaning tool is provided with a fourth check valve, and the air in the cleaning tool is discharged through the fourth check valve.

16. The cleaning tool for a negative-pressure component for battery formation of claim 11, wherein the cleaning tool comprises a filter member, the filter member is disposed in the second pipeline or disposed in the liquid storage tank.

17. A cleaning tool for a negative-pressure component for battery formation, the negative-pressure component comprising a negative-pressure cup and a suction nozzle, wherein the cleaning tool comprises:

a storage cup, wherein the storage cup is configured to engage with the negative-pressure cup, and the storage cup is communicated with an air source; and a liquid guide member, wherein the liquid guide member is provided with a liquid guide channel, and an inner cavity of the storage cup is communicated with the negative-pressure component through the liquid guide channel;
wherein a first end of the liquid guide member is configured to communicate with the negative-pressure component, and a second end of the liquid guide member is extended from a mouth of the storage cup into the storage cup;
wherein a recessed chamber is provided on the first end of the liquid guide member, the liquid guide channel is communicated with the recessed chamber, and an inner cavity of the suction nozzle is engaged with the recessed chamber.

18. The cleaning tool for a negative-pressure component for battery formation of claim 17, wherein the recessed chamber is provided as a tapered shape, an end of the recessed chamber with a smaller diameter is communicated with the liquid guide channel, and an end of the recessed chamber with a larger diameter is communicated with the negative-pressure component.

19. The cleaning tool for a negative-pressure component for battery formation of claim 17, wherein the liquid guide member comprises an end structure and a straw, the end structure is positioned at the mouth of the storage cup, the recessed chamber is provided in the end structure, the straw is connected to the end structure, and the straw is extended into the storage cup.

* * * * *